INVENTOR
BERNARD G. THOMPSON

BY D. Kendall Cooper
ATTORNEY

United States Patent Office 3,521,043

Patented July 21, 1970

3,521,043

RIPPLE-FREE BINARY CODED DECIMAL ACCUMULATOR FORMING CORRECT RESULT DURING SINGLE MEMORY ACCESSING CYCLE

Bernard G. Thompson, Lexington, Ky., assignor to International Business Machines Corporation, Armonk, N.Y., a corporation of New York Filed Sept. 15, 1967, Ser. No. 667,974
Int. Cl. G06f 5/02, 7/50
U.S. Cl. 235—170 10 Claims

ABSTRACT OF THE DISCLOSURE

The invention concerns an accumulator, with associated clocking, logic, and control circuits for performing the arithmetic operations of addition, subtraction, and shifting with binary coded decimal factors. The accumulator features the formation of a correct sum or difference at high speed while accessing the two factors only once. This is done during addition, as an example, by operating the clock circuits to read the addend from memory for entry into the accumulator and restoring it to memory during a first word time; thereafter permuting the clock so that all bits of the augend are read from memory for entry into the accumulator during the succeeding one-half word time to form a sum and determine the necessity for correction, and performing the necessary correction while the sum is written back into memory during the following one-half word time. Subtraction is performed by setting a 10 into the accumulator, subtracting the subtrahend and digit borrow from the 10, and thereafter adding the minuend to the difference. The clock is permuted during subtraction, as for addition. The method of subtraction eliminates ripple from stage-to-stage and the problem of the "elusive one." A shifting operation apart from an arithmetic operation involves permuting of the clock to access only one factor, reading the factor in one cycle and writing it in a following cycle.

CROSS REFERENCE TO RELATED PATENT

The following patent is of interest:

U.S. application Ser. No. 517,563, filed Dec. 30, 1965; now U.S. Pat. No. 3,426,185, C. Wayne Cox and Louis M. Hornung, inventors; assigned to the same assignee as the present application.

BRIEF BACKGROUND OF INVENTION

Field

Binary coded decimal accumulators normally comprise four bi-stable devices for storing the 1–2–4–8 weighted bits of the arithmetic factors. Due to the fact that four bi-stable devices operate with a radix of 16, and a decimal radix of 10 is required some means for correcting the sums developed and of generating the proper inter-digit carries, is provided for such accumulators. The present invention concerns a binary coded decimal (BCD) accumulator having such capabilities for performing addition, subtraction, and shifting and operating in a serial-by-bit, serial-by-digit manner to develop the results.

Description of the prior art

A variety of accumulator circuits have been developed in the prior art for compensating for the inherent discrepancy between the radix 16 basis on which the binary coded decimal accumulator operates and the radix 10 decimal results that are desired. In some cases, attempts have been made to modify the standard 1–2–4–8 binary weighted bits by pre-defining other weights that would give the desired radix 10. This approach usually complicates the carries between the bits, however, and is abandoned in favor of the simpler technique of correcting any accumulated sum to the radix 10.

Prior art accumulator circuits have usually been predicated on the addressing of each digit factor at least twice during any addition or subtraction cycle. During the first addressing operation, the digits addressed produce a sum or difference that may need correction, the correction taking place during a second addressing cycle. Also, the circuits have relied on ripple counters that work as follows. An individual bit from a digit is read from memory and entered into the proper weighted bi-stable device of the accumulator. As the bit is entered, the bi-stable device changes state. If it had a bit of information previously, a carry is produced into the next higher order of the accumulator. Ripple-type accumulators are basically adders. In order to subtract, it is necessary that each digit be complemented, and an "elusive one" be added to obtain a 10's complement of the number which can then be added in the accumulator.

The foregoing characteristics of prior art accumulator circuits have resulted in less efficient processing time due to the complexities and inherent accumulator delays.

SUMMARY

In accordance with the present inventive arrangements, an accumulator circuit provides sums and differences of binary coded decimal arithmetic factors with a correct radix and requiring only a single addressing of each digit during any addition or subtraction cycle. Basically, the clock circuits associate with the accumulator are arranged to access one of the factors with Read/Write cycles for each bit during a first word time, with sequential Read cycles for all of the bits in the augend occurring prior to all of the Write cycles for the same bits during the subsequent word cycle and to perform correction of any developed sum concurrently with the writing of information into memory. The permutation of the clock so that the addend is read and written back into memory during a first word time while the augend is only read from memory and not written back enables the development of the sum halfway through the second word time so that a determination can be made as to whether a correction of the sum is necessary in time for writing the sum into memory during the last half of the second word time. As will be seen, other clock permutation sequences may be used, as well.

The permutation of the clock to achieve the particular Read/Write operation just noted may be applied to various kinds of accumulators. Thus, for example, it may readily be used with the class of accumulators where the binary coded decimal factors from memory have each bit entered into a respective bit location of the accumulator that corresponds to the weight of the bit currently being addressed.

Also, the clock organization is advantageous with a shifting kind of accumulator such as that disclosed in the Cox et al. patent previously noted, where the weighted bits are always read into and written from a particular stage of the accumulator, regardless of the weighted value of the bits. The latter kind of accumulator involves the shifting of bits from stage-to-stage in the accumulator register and is the class of accumulator with which the present invention will be described. The accumulator presented herein is also ripple-free due to the logical circuitry provided that is based on the development of bit sums or differences and carries according to a repetitive cyclic bit mode of operation that involves the reading or Read/Write of a bit during a first portion of a bit time and the shifting of information in the accumulator circuits during the second portion of a bit time. The individual bits are summed in succession and stored in a trigger position as the clock advances to a new bit time. Following the development of an intermediate sum that may or may not represent a valid BCD character, the accumulator contents are checked. If the representation in the register is a non-BCD value, this fact is stored in an Add 6 latch just prior to the writing of the sum into memory. The Add 6 latch controls the entry of the "corrective 6" as the sum is written into memory. The Carry trigger in the accumulator is set if the Add 6 latch had been set.

Subtraction is accomplished by always entering a "10" into the accumulator and always assuming that a digit borrow will be necessary. The subtrahend is then subtracted from the accumulator contents and the minuend added to the difference. The method of operation results in a value in the accumulator following the subtraction of the subtrahend that always lies between zero and 10, inclusively. The minuend, when added to the accumulator, produces a result between zero and 19 just as in an addition operation. If a non-BCD value exists in the accumulator, the Add 6 latch again controls the correction of the value as the difference is written into memory. The setting of the Add 6 latch indicates that a Borrow or that the "10" that was set into the accumulator was not, in fact, necessary. Thereafter, as the clock steps into the next digit time in preparation for the next two succeeding Binary Coded Decimal factors, the Carry trigger is turned on, if the Add 6 latch is off.

In conjunction with the foregoing comments, in order for the accumulator to serve both as an adder and a subtractor, at least three features are implemented:

(1) Circuits are provided to set the "10" into the accumulator at the beginning of any subtract cycle.

(2) The accumulator circuits have the ability to subtract during the second word time.

(3) Circuits are provided to turn on the Carry trigger during addition if the Add 6 latch is on, and to turn it on during subtraction if the Add 6 latch is off.

In another mode of operation, the accumulator circuits perform a binary coded decimal shifting operation that involves only a single operand. This is a useful feature for multiplication, division, column shifting, and similar operations. The operand is read from memory in one cycle, entered in the register at one extreme trigger position, and shifted toward the opposite extreme trigger position from which it is written into memory in the following cycle.

OBJECTS

Accordingly, an important object of the present invention is to provide an accumulator and associated circuits for developing sums and differences from binary coded decimal factors at considerably higher speed than heretofore possible.

Another object of the invention is to provide accumulator circuits for developing correct sums and differences of arithmetic factors while addressing those factors only once.

A further object of the invention is to provide an accumulator circuit that is ripple-free, thereby eliminating the problem of the "elusive one."

Also, an object of the invention is to provide accumulator circuits having associated clocking means that is permuted in order to achieve more efficient processing of arithmetic factors.

A still further object of the present invention is to provide accumulator circuits that are advantageously employed with paralle-entry accumulators as well as serial shifting accumulators.

Another object of the invention is to provide accumulator circuits operable equally well for adding and subtracting arithmetic factors while eliminating the time usually required for correction of the intermediate sums and differences.

Also, another object of the invention is to provide addition and subtraction techniques for an accumulator that are executed with simplified circuitry.

The foregoing and other objects, features, and advantages of the invention will be apparent from the following more particular description of the preferred embodiment of the invention as illustrated in the accompanying drawings.

DESCRIPTION OF THE DRAWINGS

In the drawings:

FIG. 5*e* includes a Storage trigger (S) for storing bits read from memory during operations.

The following terminology is used in the present case.

| Terminology: | Comment |
|---|---|
| A1R, A2R, A4R, A8R | A digit time, Read **1** bit (A1R), Read **2** bit (A2R), etc. |
| A1W, A2W, A4W, A8W | A digit time, Write **1** bit (A1W), Write **2** bit. |
| Add **6** | Binary coded decimal corrective 6. |
| AI | And-Invert Circuit. |
| AOI | And-Or-Invert Circuit. |
| AW | A digit Write time. |
| $\overline{AW}$ | Not A digit Write time. |
| Bit **1**, Bit **2**, Bit **4**, Bit **8** | Binary coded decimal values. |
| B**1**, B**2**, B**4**, B**8** | Bit **1** time, Bit **2** time, etc. |
| Borrow | Arithmetic borrow, subtraction. |
| BCD | Binary Coded Decimal. |
| $\overline{BCD}$ | Not Binary Coded Decimal, Not an acceptable BCD value. |

| | |
|---|---|
| CY | Carry, Carry trigger. |
| $\overline{CY}$ | Not Carry. |
| Carry | Synonymous with CY. |
| Carry Store | Same as CY. |
| Enter **10** | Value entered for subtraction. |
| II | Isolating Inverter circuit. |
| LI | Clock trigger LI. |
| $\overline{LI}$ | Inverse of LI. |
| **P1, P2, P4, P8** | **P1, P2**, etc., Register trigger positions and outputs. |
| $\overline{P1}$, $\overline{P2}$, $\overline{P4}$, $\overline{P8}$ | Not **P1**, Not **P2**, etc. |
| OSC | Oscillator. |
| Register | P1, P2, etc. |
| R | Read. |
| RCY | Reset Carry trigger. |
| $\overline{RCY}$ | Inverse of Reset Carry. |
| S | Storage (S) trigger, storing a "1." |
| *S+CY* | Storage trigger *or* Carry. |
| $\overline{S}$ | Not storage, storing a "0." |
| SA | Sense Amplifier. |
| SET **10** | Set register with value "10." |
| $\overline{SET}$ $\overline{10}$ | Not Set **10**. |
| $\overline{SF}$ | Not shift function. |
| SP | Sample Pulse, shift pulse. |
| SUB | Subtract. |
| TDI | Trigger Driver Inverter, Power block to drive AC inputs. Low signal in, high out. |
| TE | Clock trigger TE. |
| $\overline{TE}$ | Inverse of TE. |
| $\overline{TF}$ | Clock trigger TF. |
| $\overline{TF}$ | Inverse of TF. |
| TG | Clock trigger TG. |
| $\overline{TG}$ | Inverse of TG. |
| TH | Clock trigger TH. |
| $\overline{TH}$ | Inverse of TH. |
| TI | Clock trigger TI. |
| $\overline{TI}$ | Inverse of TI. |
| W | Write. |
| Write Memory | Signal level indicating binary "1" value to be written in Memory during any bit time. |
| (−) | Program Subtract indication. |

DETAILED DESCRIPTION

Accumulator system configuration

Figure 1:
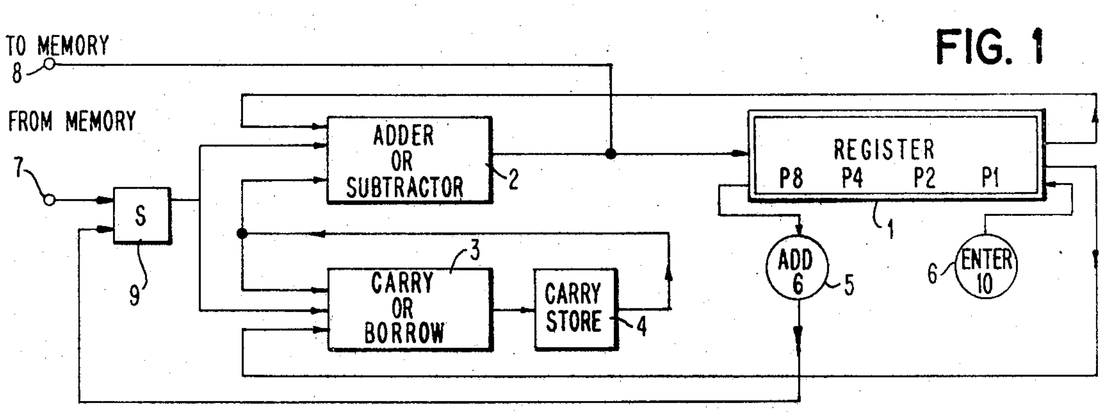
FIG. 1 is a system diagram of accumulator circuits including an adder-subtractor, a storage register, and associated logic.

The accumulator according to the present invention is set forth with block diagrams shown in FIG. 1. The system includes a Register 1 having trigger positions P1–P2–P4–P8, an associated adder or subtractor circuit 2, Carry-Borrow logic 3, a Carry Store trigger 4, Add 6 logic 5 for use in correcting non-BCD values developed in Register 1, and Enter 10 logic 6 for use during subtraction. Arithmetic factors are processed in a serial-by-bit, serial-by-digit fashion, the individual weighted bit values being derived from memory at terminal 7, returned to memory at terminal 8, and stored by storage trigger 9. In any operation, bits read from memory are compared with the status of the Carry Store circuit 4 and the contents of Register 1 corresponding with the bit addressed. Register 1 is basically a shifting type register operating with the development of sums, differences, and carry requirements during the first portion of each bit time and the appropriate shifting of the developed sums or differences near the end of each bit time. During subtraction, rather than complementing the subtrahend, then adding the minuend, the logic assumes that a Borrow is always necessary and a "10" is entered in Register 1 from logic 6 at the beginning of the subtraction operation. The subtraction logic is such that a true Borrow is derived. During addition or subtraction, the output of adder-subtractor 2 is always fed into trigger position P8 in Register 1. Trigger position P1 serves as the output of Register 1.

Basic circuits

The accumulator presented herein makes use of trigger and latch circuits, combined with And, Or, and Invert logic. As an example, the clock circuits in FIG. 2*a*, include triggers TE, TF, TG, TH, TI, and LI. The trigger circuits are gated by input levels applied to either side, change state by shifting signals supplied at the bottom, and provide true and complement outputs by terminals near the tops of the individual trigger blocks. Considering trigger TG, for example, gating inputs are provided at terminal 10 and from the AI circuit 11 or Not SF terminal 12. The triggers generally change state with a negative shifting signal applied to the lower inputs. Thus, trigger TG changes state when properly conditioned with a negative shift on the Not TE line from terminal 13. If TG is low at terminal 10, a negative shift of Not TE at terminal 13 will change trigger TG to the on state, thereby providing a high level from terminal 14. Provision of a low gating signal from AI circuit 11 changes trigger TG to the opposite state upon occurrence of a negative shift at terminal 13 to provide a Not TG high level from terminal 15. To summarize, gating signals on the left side of the trigger condition it to be turned to the on state while gating signals on the right side of the trigger condition it to be turned to the off state.

In some cases, DC inputs are provided to the triggers to control their state, regardless of the gating conditions on the triggers. The lower left input through AOI circuit 35 to the Storage trigger (S), FIG. 5*e*, turns the Storage trigger on when low regardless of the AC input from the sample pulse circuit at terminal 32b. Another example is the Not SF input at terminal 12 to a trigger TG, FIG 2*a*.

Figure 4:
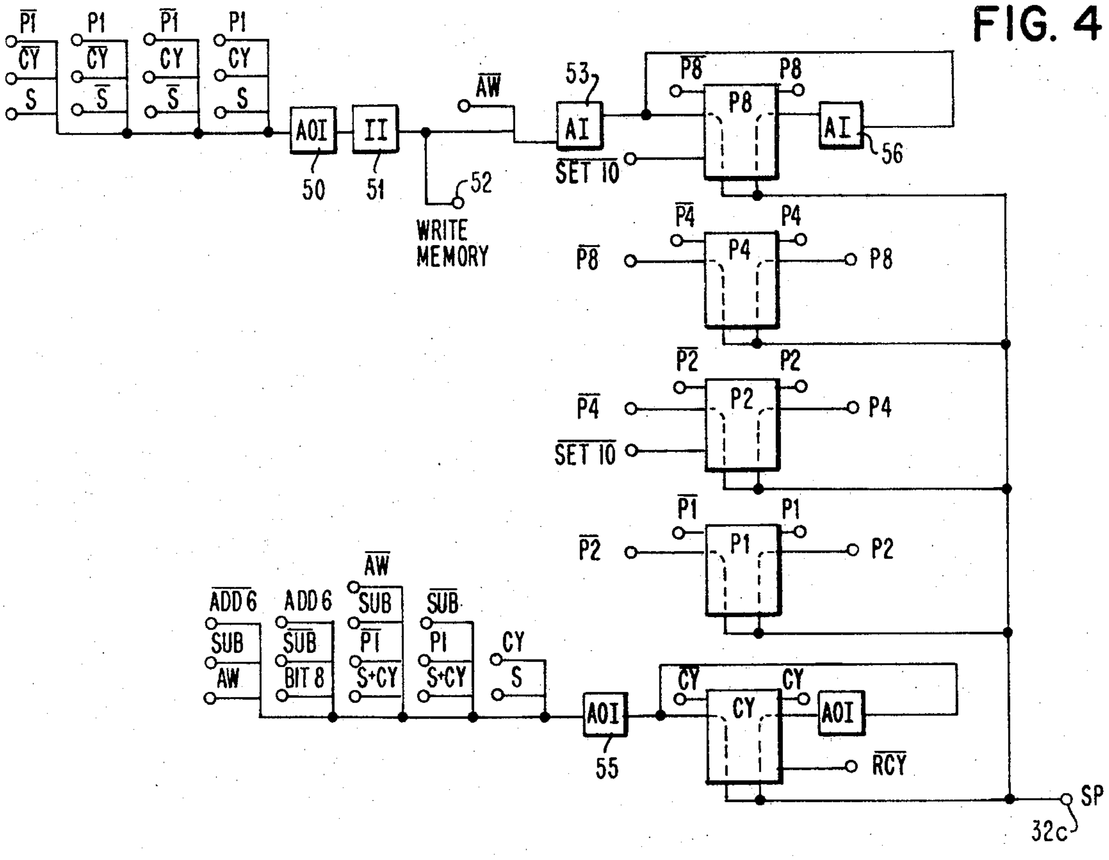
FIG. 4 shows a register including Triggers P1–P8, and Carry, together with adder-subtractor and Carry development logic.

The Carry (CY) trigger, FIG. 4, has a Not Reset Carry ($\overline{RCY}$) input which resets the trigger when dropping to a lower signal level irrespective of any AC input to the trigger.

Figure 5A:
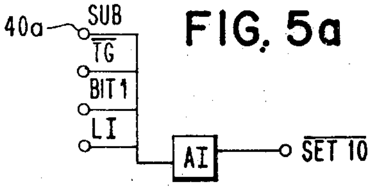
FIGS. 5*a*–5*f* show a number of logic circuits for developing signals required during operations of the accumulator.
Figure 5B:
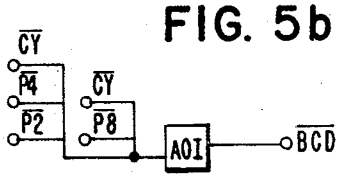
Figure 5C:
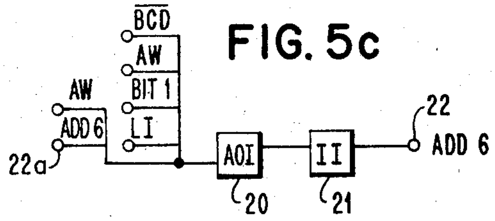

FIG. 5*c* discloses a typical latch circuit. An AOI circuit 20 has a horizontal input to the left that in turn supports two vertical posts, each having a plurality of logical signal conditions. The horizontal line to AOI 20 represents an Or connection while the vertical posts and associated terminal inputs represent individual And conditions. When all inputs of a vertical post are high, the output of the associated AI or AOI block, such as AOI 20, is low. II circuit 21 inverts signal levels supplied to it by AOI 20. Assuming that the Not BCD, A Write (AW), Bit 1, and LI inputs are satisfied, the input to AOI 20 is high, its output is low, and the II circuit 21 output to terminal 22 is high. The latch action occurs when the high level from terminal 22 is applied in a feedback loop to terminal 22*a*. This, together with the A Write (AW) clock condition holds AOI input high and latches the circuit even though the original signals Not BCD, etc. become de-conditioned. The other trigger and latch circuits in FIGS. 2*a*–5*f* operate in a manner comparable to that just described.

Clock circuits

The operation of the clock, its organization, and permutation is described by reference to FIGS. 2*a* and 6.

Figures 2A, 2B, 2C, 2D:
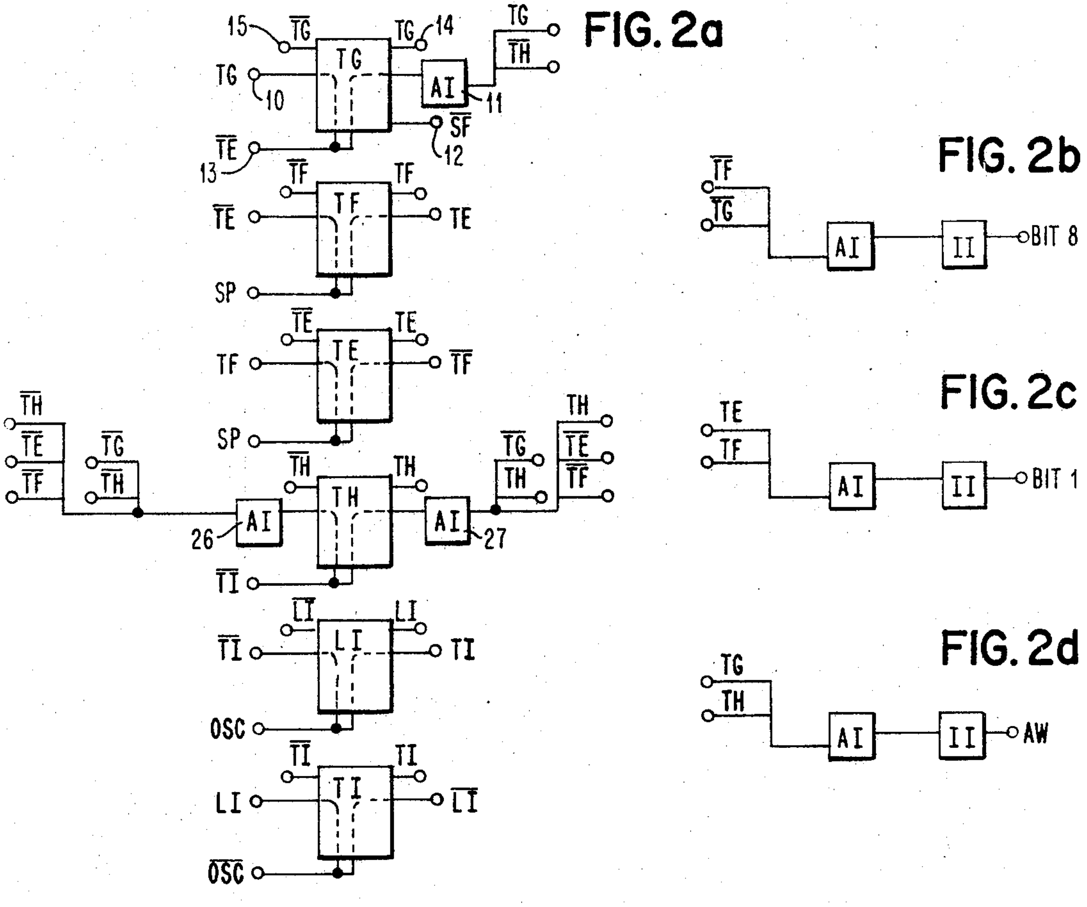
FIG. 2*a* shows a number of triggers for developing clock timing signals from a basic oscillator signal source.
FIGS. 2*b*, 2*c*, and 2*d*, respectively, develop control signals that are useful during operations, including Bit 8, Bit 1, and A Write (AW) signals.

An oscillator, such as a crystal oscillator, controls the two triggers TI and LI, FIG. 2*a*, basically as in circuits operating with the Gray code. An Oscillator input to trigger LI attempts to change the state of LI upon each negative shift. A Not Oscillator input to trigger TI performs similarly. The triggers TI and LI operate in a complementary, overlapped fashion as shown in FIG. 6.

Trigger TH, if conditioned to do so, will change state each time the TI signal drops. This is controlled by the AI circuits 26 and 27 associated with trigger TH. The on and off pattern for trigger TH is also shown in FIG. 6.

Triggers TE and TF operate in connection with trigger TH according to a Gray code and define, in combination, the sequencing of the 1–2–4–8 bits in the arithmetic factors. Triggers TE and TF operate similarly to triggers TI and LI with the exception that the former triggers are driven by sample (shift) pulses SP while the latter are driven by oscillator pulses. The sample pulses occur, in FIG. 3, when Not TH, Not TI, and LI conditions are satisfied. The sample pulse level SP together with the Not TI input latch the AI circuit 30 and the associated trigger driver inverter circuit 31. Therefore, the sample pulse level from terminal 32 is fed to terminal 32*a* and falls when Not TI falls, that is, when TI rises. The fall of the sample pulse level from terminal 32 indicates the end of each bit time.

Figure 3:
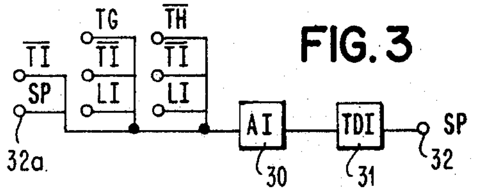
FIG. 3 is a circuit that develops a Shift (sample) pulse used during each bit time.
Figure 6:
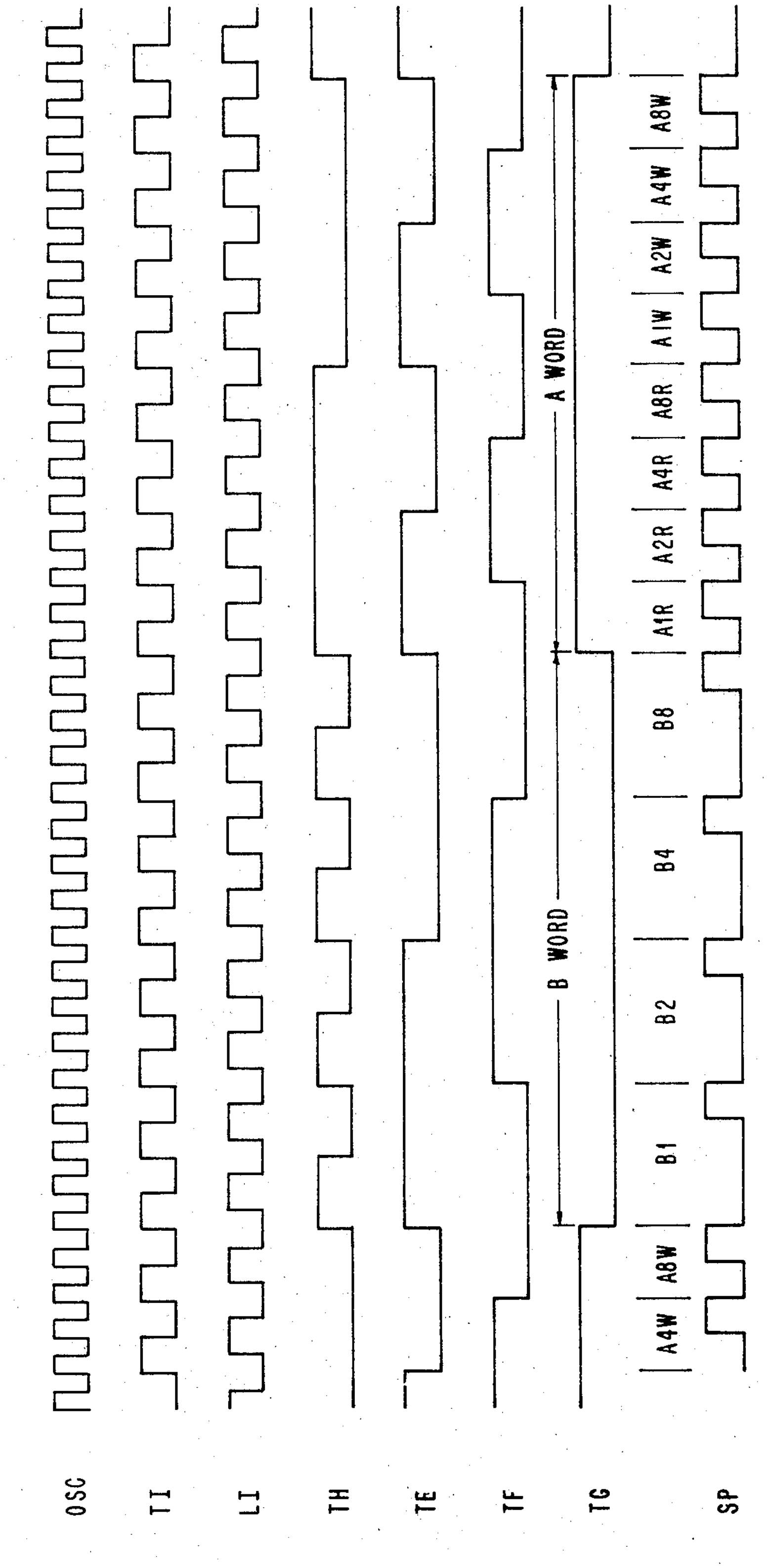
FIG. 6 illustrates the clock organization and permutation for controlling accumulator operations.

The clock circuits, FIG. 6, define a B Word time having 4 bit times B1–B2–B4–B8 each having a Read and Write operation. The circuits further define an A Word time, the first half of which involves reading of 1–2–4–8 bits in the second arithmetic factor (A1R–A8R), and the second half of which involves the writing of sum or difference values to memory during 1–2–4–8 bit times (A1W–A8W). The A Word and B Word times are defined by the state of the TG trigger, FIG. 2*a*. Referring to FIG. 3, one of the And circuits that satisfies conditions for a sample pulse output at terminal 32 involves TG, Not TI, and LI. This is used particularly during the A1R–A8R times in the A Word portion of the clock cycle, FIG. 6.

Miscellaneous control signals

A number of miscellaneous signals are required during operation of the accumulator circuits. FIG. 2*b* develops a Bit 8 time signal that is used in several places. In FIG. 4, the signal combines with a Not Subtract signal and Add 6 to set the Carry trigger. In FIG. 5*f*, it is combined with a Not TH level and a program indication that a subtraction is required indicated by a minus sign (−) to develop a subtract signal from terminal 40.

Figure 5D:
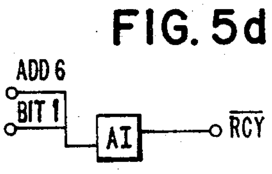

FIG. 2*c* provides a Bit 1 signal that is used in FIG. 5*a* to develop a Not Set 10 signal and in FIG. 5*d* as one of the conditions for a Not Reset Carry ($\overline{\text{RCY}}$) signal.

FIG. 2*d* supplies an A Write (AW) signal that is used in a number of places including FIGS. 4, and 5*c*. The circuit of FIG. 5*a* is used during subtraction operations with the fall of the Not Set 10 ($\overline{\text{Set 10}}$) signal setting triggers P2 and P8 in the Register of FIG. 4. This is done at the beginning of the Digit time.

FIG. 5*b* recognizes when a non-BCD value exists in trigger positions P1–P8, FIG. 4, to supply a Not BCD ($\overline{\text{BCD}}$) signal that is applied to the circuit of FIG. 5*c* to develop an Add 6 signal for developing the "corrective 6" to correct the value as the sum is written back into memory.

The circuit of FIG. 5*d* provides a Not Reset Carry ($\overline{\text{RCY}}$) signal, the fall of which resets the Carry trigger in FIG. 4 under special conditions, such as when two "9" factors are added together. If this happens, the Carry trigger in effect is storing a value 16 and the P2 trigger is storing a value of 2 which is a non-BCD value. A corrective 6 must be added to the Register, but the circuits are in 1 bit time and the circuit of 5*d* is arranged to handle this situation.

The circuits of 5*e* and 5*f* have been discussed previously.

The various And circuits associated with the AOI circuit 50 and II circuit 51, FIG. 4, serve as the adder-subtractor logic 2, FIG. 1. The output of this logic controls whether a "0" or "1" bit is written in memory from terminal 52. The output also controls the status of trigger P8 through the AI circuit 53.

The various And circuits to AOI circuit 55, FIG. 4, serve as the Carry-Borrow logic 3 for controlling the state of the Carry trigger, designated 4 in FIG. 1.

ADDITION

Typical addition of two arithmetic factors: "9" (A Word) plus "3" (B Word)

This following tabulation sets forth a typical addition of arithmetic factors, indicates the status of the various significant triggers in the accumulator circuits including P1–P8, Carry, and Storage (S) triggers, and illustrates the efficiency of the accumulator circuits gained by permutation of the clock which eliminates the necessity for additional memory cycles in order to correct non-BCD terms.

TYPICAL ADDITION 9+3

| | (A Word)+(B Word) | | | | | | Decimal count |
|---|---|---|---|---|---|---|---|
| | S | CY | P1 | P2 | P4 | P8 | |
| B Word—"3": | | | | | | | |
| 1 bit—B Word time: | | | | | | | |
| Read/Write Memory | 1 | 0 | 0 | 0 | 0 | 0 | 0 |
| Shift Pulse | 0 | 0 | 0 | 0 | 0 | 1 | 1 |
| 2 bit—B Word time: | | | | | | | |
| Read/Write Memory | 1 | 0 | 0 | 0 | 0 | 1 | 1 |
| Shift Pulse | 0 | 0 | 0 | 0 | 1 | 1 | 3 |
| 4 bit—B Word time: | | | | | | | |
| Read/Write Memory | 0 | 0 | 0 | 0 | 1 | 1 | 3 |
| Shift Pulse | 0 | 0 | 0 | 1 | 1 | 0 | 3 |
| 8 bit—B Word time: | | | | | | | |
| Read/Write Memory | 0 | 0 | 0 | 1 | 1 | 0 | 3 |
| Shift Pulse | 0 | 0 | 1 | 1 | 0 | 0 | 3 |
| A Word—"9": | | | | | | | |
| 1 bit Read—A Word time: | | | | | | | |
| Read from Memory | 1 | 0 | 1 | 1 | 0 | 0 | 3 |
| Shift Pulse | 0 | 1 | 1 | 0 | 0 | 0 | 4 |
| 2 bit Read—A Word time: | | | | | | | |
| Read from Memory | 0 | 1 | 1 | 0 | 0 | 0 | 4 |
| Shift Pulse | 0 | 1 | 0 | 0 | 0 | 0 | 4 |
| 4 bit Read—A Word time: | | | | | | | |
| Read from Memory | 0 | 1 | 0 | 0 | 0 | 0 | 4 |
| Shift Pulse | 0 | 0 | 0 | 0 | 0 | 1 | 4 |
| 8 bit Read—A Word time: | | | | | | | |
| Read from Memory | 1 | 0 | 0 | 0 | 0 | 1 | 4 |
| Shift Pulse | 0 | 0 | 0 | 0 | 1 | 1 | 12 Gate BCD |
| 1 bit Write—A Word time: | | | | | | | |
| Add 6 logic | 0 | 0 | 0 | 0 | 1 | 1 | 12 |
| Shift Pulse | 0 | 0 | 0 | 1 | 1 | 0 | 12 |
| 2 bit Write—A Word time: | | | | | | | |
| Add 6 logic (Write "2" into Memory) | 1 | 0 | 0 | 1 | 1 | 0 | 12 |
| Shift Pulse | 0 | 0 | 1 | 1 | 0 | 0 | 12 |
| 4 bit Write—A Word time: | | | | | | | |
| Add 6 logic (Line) | 1 | 0 | 1 | 1 | 0 | 0 | 12 |
| Shift Pulse | 0 | 1 | 1 | 0 | 0 | 0 | 8 |
| 8 bit Write—A Word time: | | | | | | | |
| Add 6 logic | 0 | 1 | 1 | 0 | 0 | 0 | 8 |
| Shift Pulse | 0 | 1 | 0 | 0 | 0 | 0 | 0 Carry |

Typical addition-detailed description

Figure 7:
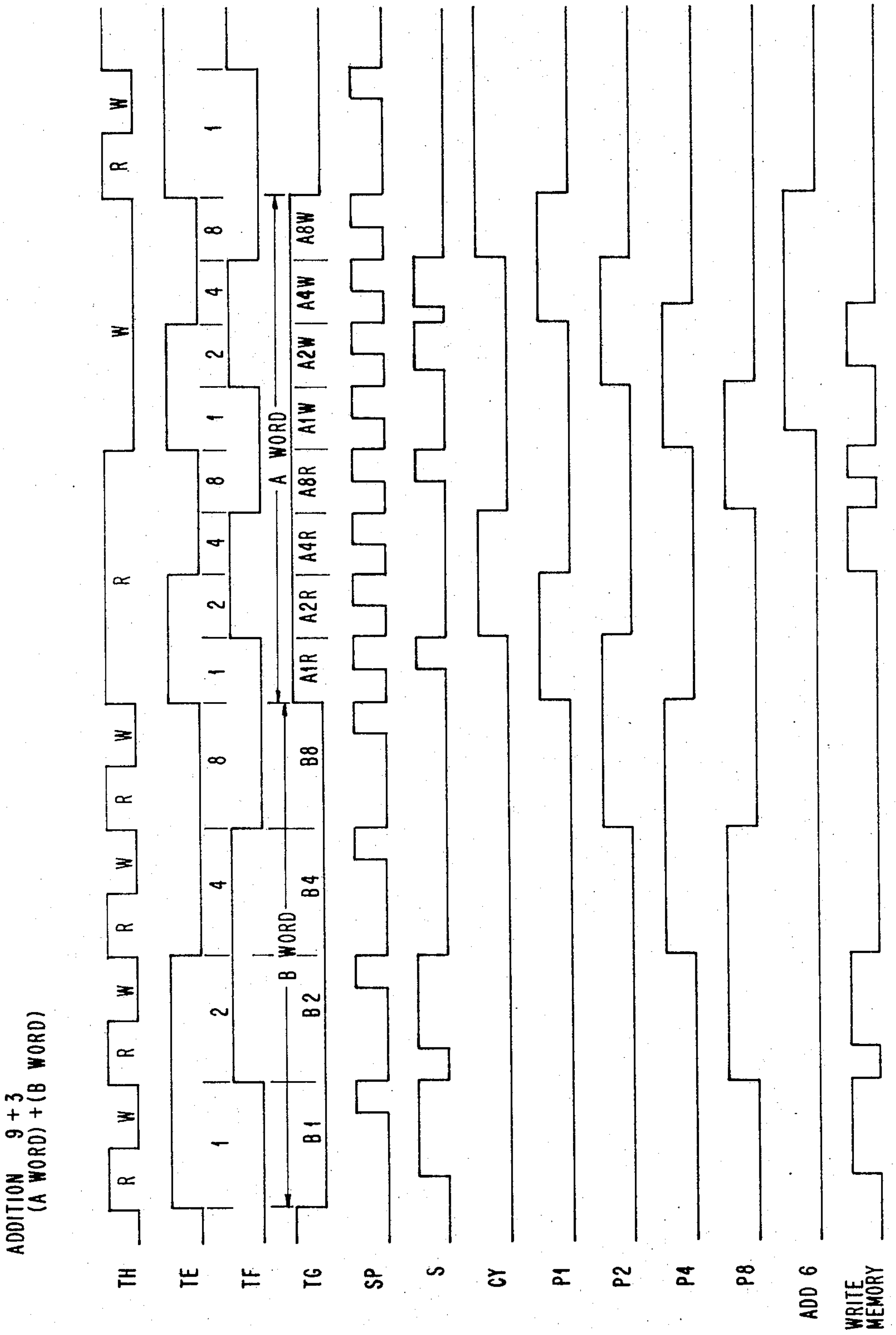
FIG. 7 illustrates a typical operation involving the addition of two arithmetic factors: a "9" (A Word) and a "3" (B Word).

The foregoing tabulation reflects the typical addition operation illustrated in FIG. 7. As indicated, the addition involves two factors "9" and "3" that are accessed during the B Word and A Word times of the digit cycle. It is assumed that no Carry exists from a lower digit order.

Figure 5E:
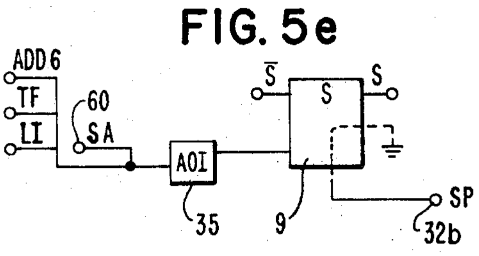
Figure 5F:
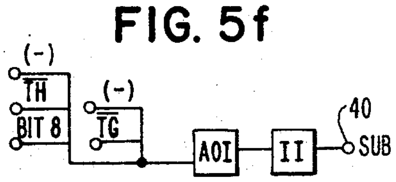

During Bit 1, B Word time, the binary coded decimal weighted value "1" of the factor "3" is read from memory at the Sense Amplifier (SA) terminal 60, FIG. 5*e*, and sets the Storage trigger. During the Write portion of Bit 1 time, the Storage trigger is tested and a "1" bit is written back into memory.

Initially, triggers P1–P8 and Carry are in the off state. The output of the AOI circuit 50 and II circuit 51 becomes high due to Not Carry, Not P1 and S inputs to the extreme left And circuit associated with the AOI circuit 50. A signal is provided at terminal 52 to restore the "1" bit of the "3" to memory. With AOI circuit 50 low and II circuit 51 high, Not AW $(\overline{AW})$ is true and the output of AI 53 is low which normally gates P8 to turn on with the next shift pulse. However, the output of the AI circuit 53 is looped around through the AI circuit 56 which has precedence and AI 56 supplying a low output actually gates trigger P8 to turn off. All of the triggers in the Register in FIG. 4 have a shift pulse input from terminal 32*c* upon occurrence of a first shift pulse, FIG. 7, trigger P8 becomes gated to turn on and does so. Shifting occurs from P8 to P4, P4 to P2, and P2 to P1. At this time, the Carry trigger is gated to turn off. This is true since none of the Carry-Borrow logic feeding the AOI circuit 55, FIG. 4, is satisfied.

During the Bit 2 time of the B Word portion of the cycle, the next weighted bit representative of a "2" value of the factor "3" is read from memory. It is entered in the Storage trigger and restored to memory as before. Upon occurrence of the shift pulse at the end of the bit time, trigger P8 is gated to turn on and remains on. Since trigger P8 was on from the previous bit time, the shift pulse moves the trigger P8 value of "1" to trigger P4. The Carry trigger is still gated to remain off.

During 4 bit time, no information is read from memory. It may be noted at this time that the Storage trigger, FIG. 5*e* is turned off at the end of each bit with a sample pulse to terminal 32*b* since the right-hand gate input to the Storage trigger is at ground and therefore always low. None of the adder-subtractor And circuits to AOI circuit 50, FIG. 4, are satisfied during 4 bit time and the AI circuit 53 output to trigger P8 is high. This feeds the AI circuit 56 on the right, the output of which becomes low, so trigger P8 is gated to turn off with the sample pulse.

During 8 bit time, no data is read from memory, trigger P8 is gated to remain off and the "1" bits in triggers P4 and P2 are shifted to triggers P2 and P1.

At this time, the clock circuits are permuted to supply A1R–A8R intervals for reading the 1–2–4–8 bits of the factor "9" in succession. During Read 1 bit time of the A Word, the "1" bit from the factor "3" is added to the "1" bit from the factor "9" with concurrent formation of a Carry bit. At the end of 1 bit time, the Storage trigger, FIG. 5*e*, is on, trigger P1, FIG. 4, is on, and the Carry trigger, FIG. 4, is off. None of the adder-subtractor logic to AOI circuit 50, FIG. 4, is satisfied since at least two low signals and one high signal or all three signals high are necessary to condition one of the And circuits to the left of the AOI circuit 50. Therefore, trigger P8 is gated to turn off and remains in the off state. This is necessary in this case since two binary "1" bits are being added together and the results should be "0." The fourth And circuit from the left that serves as an input to the AOI circuit 55 is satisfied at this time since Not Subtract is high, P1 is high, and S is high. The AOI circuit 55 has a low output and the Carry trigger is gated to turn on and does so upon occurrence of the shift pulse at the end of A1R time. Trigger P8 stays off. The rest of the bits shift through the Register as shown in the tabulation above.

During A2R time, no bit is read from memory, the Storage trigger stays off and shifting occurs as shown in the tabulation. The Carry trigger is gated to remain on at the end of A2 Read, since P1 is high, Not Subtract is high, and Carry is high.

During A4 Read time, no data is read from memory. The third And circuit feeding the AOI circuit 50 is satisfied since Not P1, Carry, and Not Storage are true at this time. Therefore, upon occurrence of the shift pulse, trigger P8 turns on as shown in the tabulation. Also, none of the And circuits feeding the AOI circuit 55 are satisfied so the Carry trigger is gated to turn off.

During AI Read time, the weighted "8" bit from memory sets the storage trigger, FIG. 5*e*. Write memory at terminal 52 is high since Carry is off, P1 is off, and Storage trigger is on. Trigger P8 is gated to turn on and Carry is gated to turn off and remains off.

To summarize, at the end of 8 bit time, the condition of the Register finds P1 off, P2 off, P4 on, and P8 on, with Carry also being off. The Binary Coded Decimal value in the Register is "12," a non-BCD value that will require correction.

In FIG. 5*b*, Not P4 is low and Not P8 is low so the AOI output is high. This is fed to the Add 6 latch in FIG. 5*c* and sets this circuit upon occurrence of A Write (AW) time, FIG. 7. The Add 6 latch circuit comes on and remains on throughout the A Write interval. Since this involves the writing of memory, no inputs are supplied to the Storage trigger during this interval. However, the Add 6 input together with TF and LI inputs through the AOI circuit 35 conditions the Storage trigger to turn on at "2" and "4" bit times as the value in triggers P1–P8 is returned to memory.

The action involves the addition of the "12" in the Register with the corrective "6," a total of "18." This represents a net result of "2" in the Register that actually goes back to memory together with a Carry bit stored in the Carry trigger at the end of A Write time.

All during the A Write time interval, A1 circuit 53 has a high output so that trigger P8 is gated to turn off during this entire time. Therefore, a "0" value is the only thing that can be entered into trigger P8. Since this is shifted through the Register, the Register is cleared at the end of A Write time.

During A1 Write time, S is off, Carry is off, and P1 is off so that Write memory at terminal 52 is low and a "0" is written back to memory.

During A2 Write time, S is on, Carry is off, P1 is off so that a bit representing a binary coded decimal value of "2" is written into memory. As shifting occurs at the end of A2 Write time, the 4 bit from the intermediate value "12" enters trigger P1. As it enters P1, the logic for Write Memory from terminal 52 is high into 4 bit time, but when the storage trigger comes on due to the "Add 6" conditions previously set up, the status is now S, P1, and Not Carry. This causes the Write Memory signal from terminal 52 to fall as shown in FIG. 7 and only a "0" is written into memory. As this takes place, a Carry is generated due to Not Subtract, P1, and S conditions to the fourth And circuit from the left serving as an input to the AOI circuit 55.

At the beginning of A8 Write time, P1 stores the "8" value from the intermediate value "12" that existed in the Register prior to the addition of the corrective 6. At this time the conditions are Carry and P1 so that a "0" is written into memory. However, it is necessary to generate a Carry bit for consideration with the next higher order digit during the operation. This is done in FIG. 4 with the second And circuit from the left since Add 6, Not subtract, and Bit 8 are all low and the Carry trigger is gated to carry on with the shift pulse.

To summarize, a "2" has been written into memory and the Carry trigger is in the on state in preparation for the next digit time.

SUBTRACTION

Typical subtraction of two factors: "3" (A Word) minus "9" (B Word)

As indicated earlier in the present case, subtraction is performed by always assuming a Borrow will be necessary during the operation and anticipating such Borrow by entering a "10" value into the P1–P2–P4–P8 register positions in order that the digits may be worked within their true form, rather than their complementary form.

Figure 8:
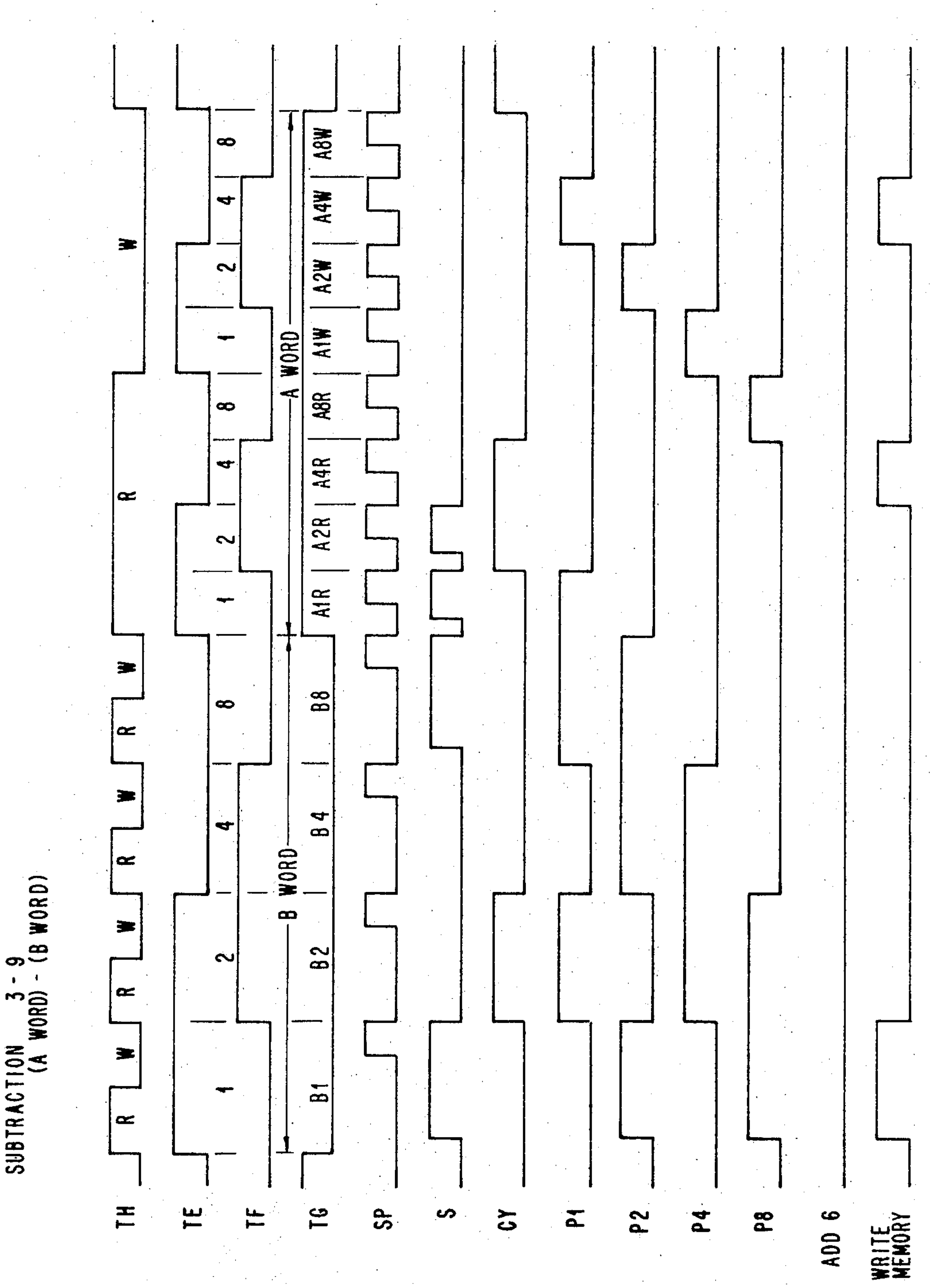
FIG. 8 represents a typical operation involving the subtraction of one factor from another: a "9" (B Word) is subtracted from a "3" (A Word).

The following tabulation sets forth the subtraction operation together with the status of the various triggers P1–P8, Carry, and Storage during all of the subtraction intervals shown in FIG. 8.

TYPICAL SUBTRACTION 3-9

| | (A Word)−(B Word) | | | | | | Decimal count |
|---|---|---|---|---|---|---|---|
| | S | CY | P1 | P2 | P4 | P8 | |
| B Word—"9": | | | | | | | |
| 1 bit—B Word Time | | | | | | | |
| Read/Write Memory and Set "10" in Register | 1 | 0 | 0 | 1 | 0 | 1 | 10 |
| Shift Pulse | 0 | 1 | 1 | 0 | 1 | 1 | 9 |
| 2 bit—B Word Time: | | | | | | | |
| Read/Write Memory | 0 | 1 | 1 | 0 | 1 | 1 | 9 |
| Shift Pulse | 0 | 0 | 0 | 1 | 1 | 0 | 9 |
| 4 bit—B Word Time: | | | | | | | |
| Read/Write Memory | 0 | 0 | 0 | 1 | 1 | 0 | 9 |
| Shift Pulse | 0 | 0 | 1 | 1 | 0 | 0 | 9 |
| 8 bit—B Word Time: | | | | | | | |
| Read/Write Memory | 1 | 0 | 1 | 1 | 0 | 0 | 9 |
| Shift Pulse | 0 | 0 | 1 | 0 | 0 | 0 | 1 |
| A Word—"3": | | | | | | | |
| 1 bit Read—A Word Time: | | | | | | | |
| Read Memory | 1 | 0 | 1 | 0 | 0 | 0 | 1 |
| Shift Pulse | 0 | 1 | 0 | 0 | 0 | 0 | 2 |
| 2 bit Read—A Word Time: | | | | | | | |
| Read Memory | 1 | 1 | 0 | 0 | 0 | 0 | 2 |
| Shift Pulse | 0 | 1 | 0 | 0 | 0 | 0 | 4 |
| 4 bit Read—A Word Time: | | | | | | | |
| Read Memory | 0 | 1 | 0 | 0 | 0 | 0 | 4 |
| Shift Pulse | 0 | 0 | 0 | 0 | 0 | 1 | 4 |
| 8 bit Read—A Word Time: | | | | | | | |
| Read Memory | 0 | 0 | 0 | 0 | 0 | 1 | 4 |
| Shift Pulse | 0 | 0 | 0 | 0 | 1 | 0 | 4 |
| 1 bit Write—A Word Time: | | | | | | | |
| Write Memory | 0 | 0 | 0 | 0 | 1 | 0 | 4 |
| Shift Pulse | 0 | 0 | 0 | 1 | 0 | 0 | 4 |
| 2 bit Write—A Word Time: | | | | | | | |
| Write Memory | 0 | 0 | 0 | 1 | 0 | 0 | 4 |
| Shift Pulse | 0 | 0 | 1 | 0 | 0 | 0 | 4 |
| 4 bit Write—A Word Time: | | | | | | | |
| Write Memory logic (Write "4"*) | 0 | 0 | 1 | 0 | 0 | 0 | 4 |
| Shift Pulse | 0 | 0 | 0 | 0 | 0 | 0 | 0 |
| 8 bit Write—A Word Time: | | | | | | | |
| Write Memory logic | 0 | 0 | 0 | 0 | 0 | 0 | 0 |
| Shift Pulse | 0 | 1 | 0 | 0 | 0 | 0 | 0 |
| | | | | | | +Borrow | |

Subtraction—Detailed description

The subtraction of "9" from "3" should result in a value of "4" in the Register plus a Borrow indication stored in the Carry trigger. At the beginning of the digit time, a "10" is set into the Register by the circuit of FIG. 5*a*. When the Not Set 10 ($\overline{\text{Set }\mathbf{10}}$) signal falls during the first bit time of B Word time, triggers P2 and P8 are set to the on state. It is assumed that the computer program supplies an indication that a subtraction operation is necesary at this time with the designation: (−) as shown particularly in FIG. 5*f*. The subtraction signal from terminal 40 gates the circuit of FIG. 5*a* at terminal 40*a*. The subtraction signal remains up all during Not TG, that is, all during B time. It is also up for a short time at the end of A time during Bit 8, Write time.

It is assumed that there was no previous digit Borrow. During Bit 1 of the B Word time, the "1" weighted portion of the factor "3" is read from memory and sets the Storage trigger, FIG. 5*e*. This bit is subsequently written back into memory from terminal 52. The shift pulse at the end of Bit 1 time finds S on, Carry off, and P1 off to gate P8 on. This also gates the Carry trigger through the third And circuit from the left with Not AW (indicating B time), Subtract, Not P1, and Storage trigger.

During the 2 bit interval, no data is read from memory and the contents of the Register are shifted. Trigger P8 is gated to turn off and Carry is gated to turn off with the shift pulse.

During 4 bit time, no data is read from memory and only shifting takes place.

During 8 bit time of the B Word, the shift pulse gates trigger P8 and the Carry trigger to remain off. The "8" weighted value from the factor "9" is set in the Storage trigger. With S on, Carry off, and P1 on, the 8 bit from the originally entered "10" is returned to memory. The Write memory circuits at terminal 52 and associated AI circuit 53 is low which gates trigger P8 to remain off. Carry is also gated to remain off.

At the beginning of the A Word time, the clock is permuted as during an addition operation to provide a succession of read intervals for the 1–2–4–8 bits of the A word. At this time, the P1 trigger stores a "1" which represents the "10" minus "9," for a difference of "1." The operation now calls for the addition of the factor "3" which is done during A word Read time. The "1" weighted value from the factor "3" is read from memory and sets the Storage trigger on. Storage on and P1 on gates trigger P8 to remain off but further gates the Carry trigger to turn on with the shift pulse.

During the next bit interval, the "2" value from the "3" is set into the storage trigger and the condition S, Carry, and Not P1 condition the P8 trigger to remain off and the Carry trigger to remain on.

Nothing is read from memory during 4 bit time but the conditions S, Not Carry, and Not P1 gate trigger P8 to turn on at the end of the bit interval since the first And leg feeding the AOI circuit 50 is conditioned upon occurrence of a shift pulse. Therefore, a "1" bit is written into trigger P8.

During 8 bit time of the A word, nothing is read from memory and S off, Carry off, and P1 off gates trigger P8 to turn off.

At this time, trigger P4 represents a value of "4" in the accumulator. This occurs from the entry of "10" minus "9," which equals "1," plus "3" which nets a value of "4." This is a valid BCD value, so the Not BCD circuit in FIG. 5*b* is low. Therefore, the Add 6 latch in FIG. 5*c* is not set in this case, and the Storage trigger does not come on at all during A Write time of the subtraction operation.

Considering the adder-subtractor logic associated with the AOI circuit 50, FIG. 4, during the 1 bit Write time of the A Word, S is low, Carry is low, and P1 is low so that a "0" is written to memory from terminal 52.

During the 2 bit interval, the same conditions apply and a "0" is written to memory.

During the 4 bit time, the Not S, Not Carry, and P1 inputs to the second And circuit feeding AOI 50 supply a Write Memory output at terminal 52, thereby restoring the value "4" to memory. All of the triggers are in the off state.

During the 8 bit interval, the logic feeding the Carry trigger sets it on to reflect the fact that a Borrow was necessary during the present subtraction operation. This is done by way of the first And circuit feeding the AOI circuit 55 since Not Add 6, Subtract, and A Write time are satisfied, thereby gating the Carry trigger to turn on. At this time, the circuits are in readiness for the next digit time.

Alternative clock permutation sequences

Clock permutation sequences, other than that described for the typical addition and subtraction operations, may be used. In general, the first three-fourths (¾) of a digit interval involve the reading and writing of one operand and reading only of the other operand. In the last one-fourth (¼) of a digit interval, the result is restored to memory. Following are examples of alternative clock sequences for the first ¾ of the digit interval. The last ¼ of the digit interval remains the same.

| Portion of digit interval: | Alternative clock sequence No. 1 |
|---|---|
| ¾ | Read-Write 1 bit, B word<br>Read 1 bit, A word<br>Read-Write 2 bit, B word<br>Read 2 bit, A word, etc. |

| | Alternative clock sequence No. 2 |
|---|---|
| ½ | Read 1 bit, B word<br>Read 2 bit, B word<br>Read 4 bit, B word<br>Read 8 bit, B word<br>Write 1 bit, B word, etc.<br>* * * * * |
| ¼ | Read 1 bit, A word<br>Read 2 bit, A word, etc. |

| | |
|---|---|
| | Alternative clock sequence No. 3 |
| ¾ ------------- | Read 1 bit, A word<br>Read-Write 1 bit, B word<br>Read 2 bit, A word<br>Read-Write 2 bit, B word, etc. |
| | Alternative clock sequence No. 4 |
| ¼ ------------- | Read 1 bit, A word<br>Read 2 bit, A word, etc.<br>* * * * * |
| ½ ------------- | Read-Write 1 bit, B word<br>Read-Write 2 bit, B word, etc. |

Shifting operations

Many operations involve the accessing of only one operand to perform a column shift or shifting to multiply or divided by a factor of 10. Not SF is gated at terminal 12, FIG. 2*a* to degate trigger TG, thereby eliminating the A word time in each digit interval. The apparatus operates with a succession of B digit time intervals. 1–2–4–8 bits are entered in P8 and shift toward P1. They are available, therefore, in the same 1–2–4–8 order in the next digit interval from P1 and this effects shifting of the factor. The following illustrates the sequence for multiplying a units factor "3" by "10" to derive a tens result "30." A division by "10" is accomplished by reading the high order digit first, and lower order digits, subsequently.

TYPICAL SHIFTING OPERATION: 3×10=30

| B Word—"3" | S | P1 | P2 | P4 | P8 |
|---|---|---|---|---|---|
| First Digit Interval—"Units": | | | | | |
| 1 bit—B Word time: | | | | | |
| Read from Memory | 1 | 0 | 0 | 0 | 0 |
| Write from P1 | 0 | 0 | 0 | 0 | 0 |
| Shift Pulse | 0 | 0 | 0 | 0 | 0 |
| 2 bit—B Word time: | | | | | |
| Read from Memory | 1 | 0 | 0 | 0 | 1 |
| Write from P1 | 0 | 0 | 0 | 0 | 1 |
| Shift Pulse | 0 | 0 | 0 | 1 | 1 |
| 4 bit—B Word time: | | | | | |
| Read from Memory | 0 | 0 | 0 | 1 | 1 |
| Write from P1 | 0 | 0 | 0 | 1 | 1 |
| Shift Pulse | 0 | 0 | 1 | 1 | 0 |
| 8 bit—B Word time: | | | | | |
| Read from Memory | 0 | 0 | 1 | 1 | 0 |
| Write from P1 | 0 | 0 | 1 | 1 | 0 |
| Shift Pulse | 0 | 1 | 1 | 0 | 0 |
| Second Digit Interval—"Tens": | | | | | |
| 1 bit—B Word time: | | | | | |
| Read from Memory | 0 | 1 | 1 | 0 | 0 |
| Write from P1 | 1 | 1 | 1 | 0 | 0 |
| Shift Pulse | 0 | 1 | 0 | 0 | 0 |
| 2 bit—B Word time: | | | | | |
| Read from Memory | 0 | 1 | 0 | 0 | 0 |
| Write from P1 | 1 | 1 | 0 | 0 | 0 |
| Shift Pulse | 0 | 0 | 0 | 0 | 0 |
| 4 bit—B Word time: | | | | | |
| Read from Memory | 0 | 0 | 0 | 0 | 0 |
| Write from P1 | 0 | 0 | 0 | 0 | 0 |
| Shift Pulse | 0 | 0 | 0 | 0 | 0 |
| bit—B Word time: | | | | | |
| Read from Memory | 0 | 0 | 0 | 0 | 0 |
| Write from P1 | 0 | 0 | 0 | 0 | 0 |
| Shift Pulse | 0 | 0 | 0 | 0 | 0 |

Result="30".

EPILOGUE

From the foregoing description, it is apparent that the inventive arrangements set forth herein in connection with the accumulator and associated circuits provide considerable savings in time since the correct result in an arithmetic operation is formed while addressing each arithmetic factor only once. Also, the problems inherent in ripple-type accumulators are avoided by a unique method of subtraction based on the assumption that a Borrow will always occur and preparing for such Borrow by entering a 10 in the accumulator prior to entry of any of the digits. The numbers can thereby be worked on in their true form rather than their complementary form and no compensation is necessary for the "elusive one," normally encountered. Much of the value of the accumulator and associated circuits is derived from the permutation of the clock in order to insure optimum and efficient operation of the circuits.

While the invention has been particularly shown and described with reference to a preferred embodiment, it will be understood by those skilled in the art that various changes in form and detail may be made without departing from the spirit and scope of the invention.

What is claimed is:

1. An accumulator circuit for performing arithmetic operations with at least first and second numerical digit factors stored in a data source, during successive digital cycles of operations, said factors each having corresponding weighted ordinal bit positions, comprising:

a register, said register having a plurality of ordinal weighted positions corresponding in number to the ordinal bit positions in said factors, and including a carry store for storing inter-digit carries or borrows;

arithmetic logic interconnected with said register, said logic including first means for developing accumulated results from weighted bit values in said factors, from inter-bit carries, and from bit indications supplied by said register, said developed accumulated results included valid and non-valid digit representations, second means for controlling the setting and resetting of said store, and correction means for initiating correction of results when required;

a clocking circuit having pulse generating means for supplying timing pulses including read pulses and write pulses;

read-write circuit means responsive to read pulses from said clocking circuit to read factors from said data source for the development of accumulated values in said arithmetic logic and responsive to write pulses from said clocking circuit to restore factors and results to said data source;

control means including factor accessing means for operating said clocking circuit and said read-write circuit means during a first portion of a digit interval to at least read all bit values of said first and second numerical factors from said data source; and further including result means for operating said clocking circuit and said read-write circuit means during a second portion of a digit interval to write into said data source; and correction control means operable on a selective basis, as required, solely coextensively with said second portion of a digit interval to activate said correction means concurrently with restoration of an accumulated result to develop and restore a final result representing a valid arithmetic digit representation.

2. The apparatus of claim 1, further comprising:

restore means in said control means operable in the first portion of a digit interval to write back one of said numerical factors into said data source.

3. The accumulator circuit of claim 1, wherein:

said digit factors are binary coded decimal (BCD) values having 1–2–4–8 weighted ordinal positions; wherein results accumulated in said register constitute valid BCD values and non-BCD values; and further comprising detection means for determining when a non-BCD value has been accumulated in said register; and means included in said correction means controlled by said detection means for suplying a corrective BCD value and correcting any non-BCD value concurrently with the writing of said value in said data source.

4. The accumulator circuit of claim 3, wherein said arithmetic logic comprises an adder-subtractor circuit; wherein said carry store stores inter-digit carries and borrows; and further comprising:

mode control means for establishing an addition mode of operation and a subtraction mode of operation, as required;

means in said correction means for supplying a "corrective 6" for non-BCD values during addition operations, as required; and additional circuitry operated by said control means and said mode control means as a first step in any subtraction digit interval to enter the value "10" in said accumulator, and to thereafter operate in conjunction with said control means for subtracting a first factor from said accumulator taking into account any borrow from a previously developed digit value, to subsequently add said second factor in said accumulator, to operate said detection means and said correction means in the event a non-BCD value exists in said accumulator to effect correction of the same as it is written into said data source and to control the setting of said carry store to indicate when a borrow is actually necessary.

5. The apparatus of claim 3, wherein:

said control means includes means to activate said clocking circuit and said read-write circuit means to provide a first B word bit pulse interval with bit pulse intervals designated B1–B2–B4–B8, each of said B word bit pulse intervals having a Read pulse sub-interval and a Write pulse sub-interval, a second A word bit pulse interval defining a first half-word pulse interval with Read only bit pulse intervals designated A1 Read-A2 Read-A4 Read-A8 Read, and a second half-word bit pulse interval with Write only bit pulse intervals designated A1 Write-A2 Write-A4 Write-A8 Write.

6. The accumulator circuit of claim 3, further comprising:

a storage trigger for storing bit values during arithmetic operations; and means in said corrections means operative to set said storage trigger with the value required to correct non-BCD values in said accumulator during the writing of the result into said data source.

7. The accumulator circuit of claim 6, wherein:

said arithmetic logic includes means responsive to storage trigger inputs, carry store inputs, and bit indications from said register for developing accumulated values.

8. An accumulator circuit for performing arithmetic operations with at least first and second numerical digit factors stored in a data source during successive digital cycles of operations, said factors each having corresponding weighted ordinal bit positions, comprising:

a register, said register having a plurality of ordinal weighted positions corresponding in number to the ordinal bit positions in said factors, at least one of said register positions serving as an input to said register and supply an output indicative of a bit value stored in said register;

a carry store for storing inter-digit carries or borrows;

arithmetic logic interconnected with said register, said logic including first means for developing accumulated results from weighted bit values in said factors from inter-bit carries, and from bit indications supplied by said register, said developed accumulated results included valid and non-valid digit representations, second means for controlling the setting and resetting of said store, and correction means for initiating correction of results when required;

carry logic associated with said carry store for controlling the setting and resetting of said store;

a clocking circuit having pulse generating means for supplying timing pulses including digit pulses that define digit intervals, word pulses that define word intervals, half-word pulses that define half-word intervals, ordinal pulses that define ordinal bit intervals, read pulses that define reading sub-intervals for accessing factor bits from said data source to develop accumulated values in said arithmetic logic, and write pulses that define writing sub-intervals for restoring accumulated bit values to said data source;

read-write circuit means responsive to read pulses from said clocking circuit to read factors from said data source for the development of accumulated values in said arithmetic logic and responsive to write pulses from said clocking circuit to restore factors and results to said data source;

and control means including factor accessing means for operating said clocking circuit and said read-write circuit means during a first portion of a digit interval to supply pulses to access all bit values of a first factor from said data source, to supply said bit values to said arithmetic logic and said register, and to write said first factor bit values into said data source; said accessing means being operable in a second portion of a digit interval to access all bit values of a second factor from said data source and supply the same to said arithmetic logic means and said register in order to develop an accumulated value; result means for operating said clocking circuit and said read-write circuit means during a third-portion of a digit interval to write into said data source; and correction control means operable on a selective basis, as required, solely coextensively with said third portion of a digit interval to activate said arithmetic logic correction means concurrently with restoration of an accumulatod result to develop and restore a final result representing a valid arithmetic digit representation.

9. The accumulator circuit of claim 8, wherein said register comprises trigger positions designated P1–P2–P4–P8 corresponding to the ordinal positions in said digit factors and further comprising:

shift means to operate said register as a shifting register during the accumulation of results;

means in said clocking circuit for supplying counting sub-interval pulses and shifting sub-interval pulses;

means in said arithmetic logic to develop accumulated bit values and means in said carry logic to develop carry values during sub-intervals defined by said counting sub-interval pulses; and means in said control means further operative in shifting sub-intervals defined by said shifting pulses to set said accumulated bit values in the P8 register position, to shift previously stored values in said register in a direction from P8 to P4 to P2 to P1 to said carry store, and to set carry or borrow values in said carry store, as required.

10. The accumulator circuit of claim 8, further comprising:

shift means in said control means to establish an additional mode of operation for shifting digits to multiply or divide by a factor, as desired, said shift means activating said clocking circuit and said read-write circuit means to access bits of a single factor with accessed bits being entered in said register at the input and withdrawn at the output displaced by one digit interval, the operation thereby effecting a shift of digits from one digit interval to the next digit interval.

References Cited

UNITED STATES PATENTS

| | | | |
|---|---|---|---|
| 3,260,840 | 7/1966 | King | 235—169 |
| 3,426,185 | 2/1969 | Cox et al. | 235—176 |
| 3,083,910 | 4/1963 | Berkin | 235—170 X |

MALCOLM A. MORRISON, Primary Examiner

D. H. MALZAHA, Assistant Examiner

U.S. Cl. X.R.

235—176